(12) United States Patent
Lei

(10) Patent No.: US 7,542,665 B2
(45) Date of Patent: Jun. 2, 2009

(54) FULLY AUTOMATIC, HEAD MOUNTED, HAND AND EYE FREE CAMERA SYSTEM AND PHOTOGRAPHY

(76) Inventor: Tianmo Lei, 814 Betlin Ave., Cupertino, CA (US) 95014

(*) Notice: Subject to any disclaimer, the term of this patent is extended or adjusted under 35 U.S.C. 154(b) by 499 days.

(21) Appl. No.: 11/307,856

(22) Filed: Feb. 24, 2006

(65) Prior Publication Data

US 2007/0201847 A1   Aug. 30, 2007

(51) Int. Cl.
*G03B 13/20* (2006.01)
(52) U.S. Cl. ..................................... 396/51; 348/333.03
(58) Field of Classification Search .................. 396/51, 396/325, 333; 348/333.03
See application file for complete search history.

(56) References Cited

U.S. PATENT DOCUMENTS 4,516,157 A * 5/1985 Campbell .................... 348/158
5,610,678 A * 3/1997 Tsuboi et al. ................ 396/373
2005/0195277 A1 * 9/2005 Yamasaki ..................... 348/61

* cited by examiner

*Primary Examiner*—W. B. Perkey
*Assistant Examiner*—Fang-Chi Chang

(57) ABSTRACT

A fully automatic, head mounted, hand and eye free camera System and photography are disclosed. The fully automatic, head mounted, hand and eye free camera System consist of three components: A) a head mounted camera header, B) a portable personal computer, and C) a hand hold controller. The component A (head mounted camera header) is composed of two set of eye ball trackers/range finder/digital camera headers. The component B (portable personal computer) control eye ball tracker and the range finder to determine the direction of eye sight and the distance between the eye and the target, and adjusts the lens of the digital camera header to aim at and focus on target to take pictures or record video and to save the pictures or video to the storage of the portable personal computer. The user control whole system by pressing the buttons at component C (hand hold controller). The aiming, focusing, and the capturing procedure is automatic, continuous, and in the real time, and is a true process of "What you see is what you get (photo or video)".

3 Claims, 8 Drawing Sheets

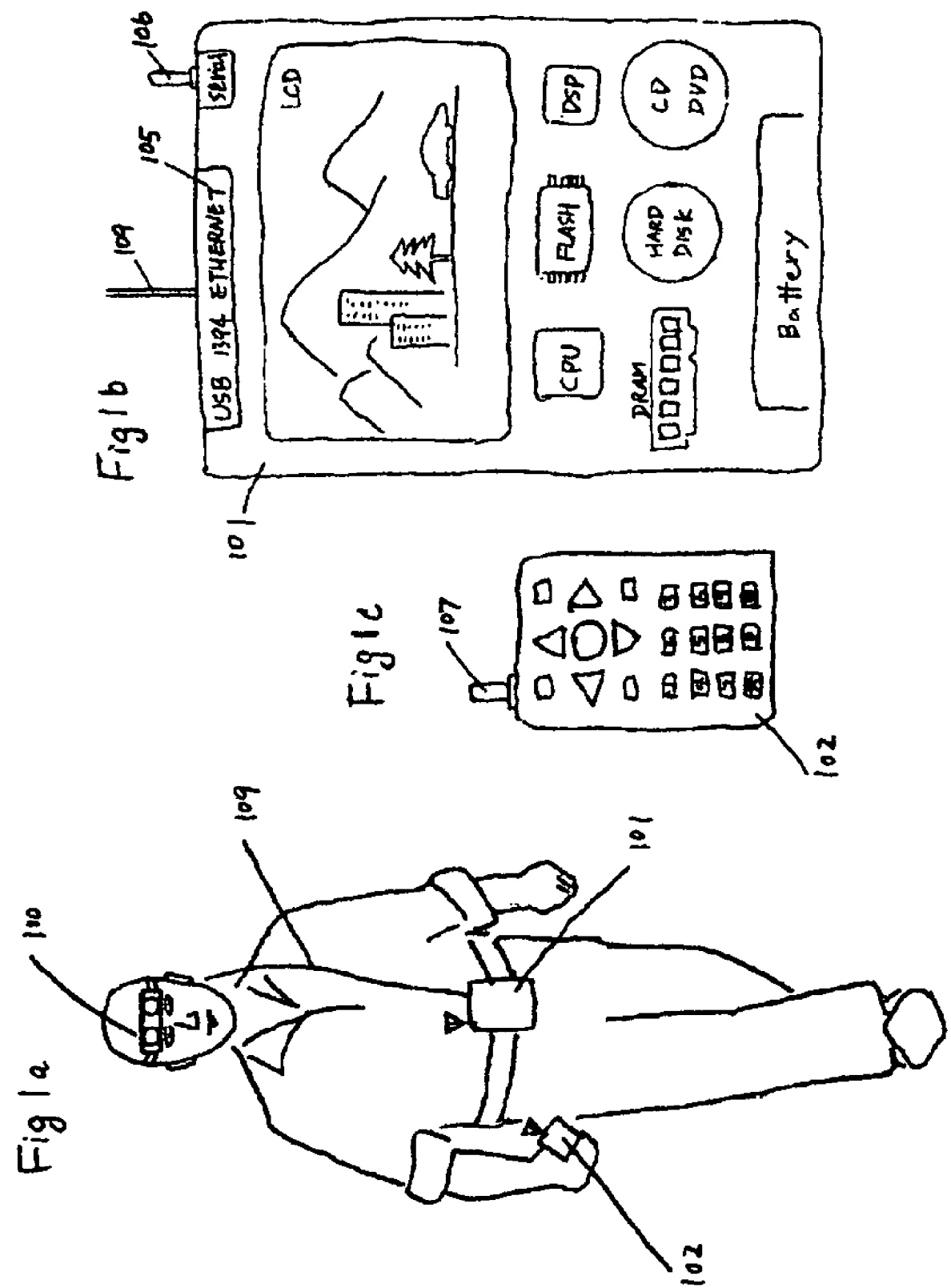

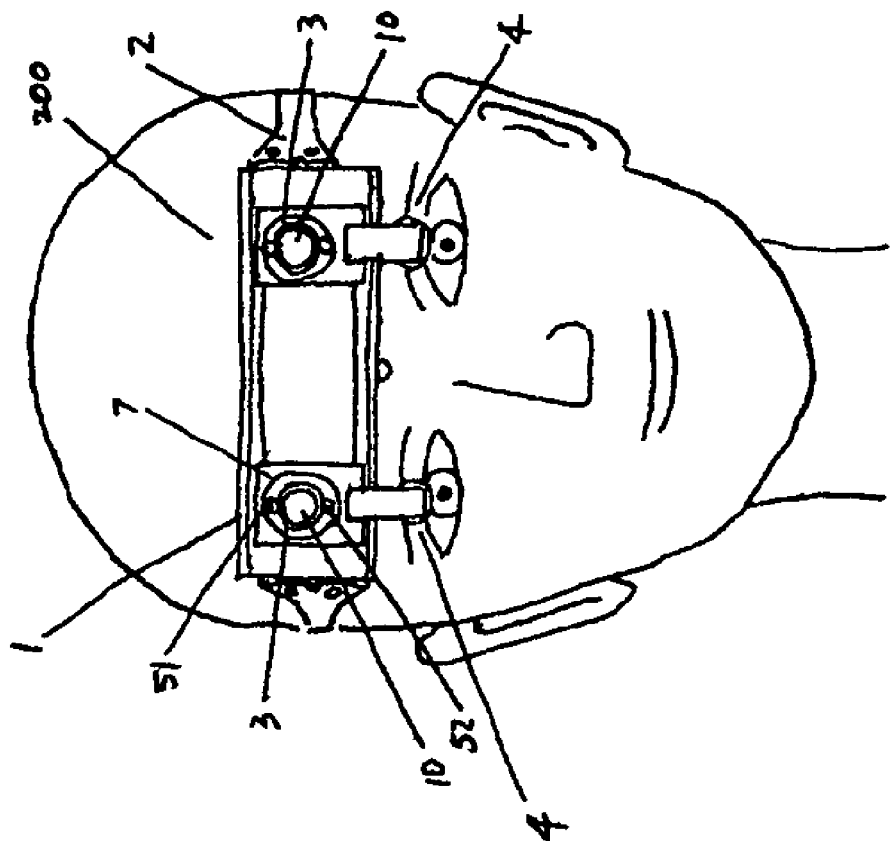
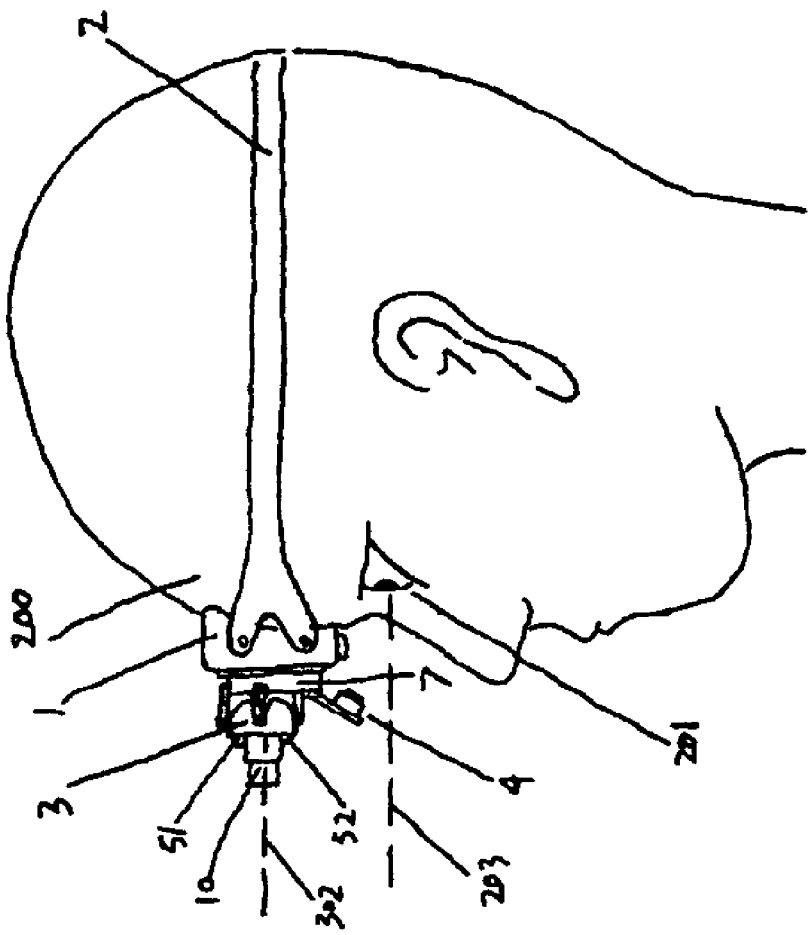

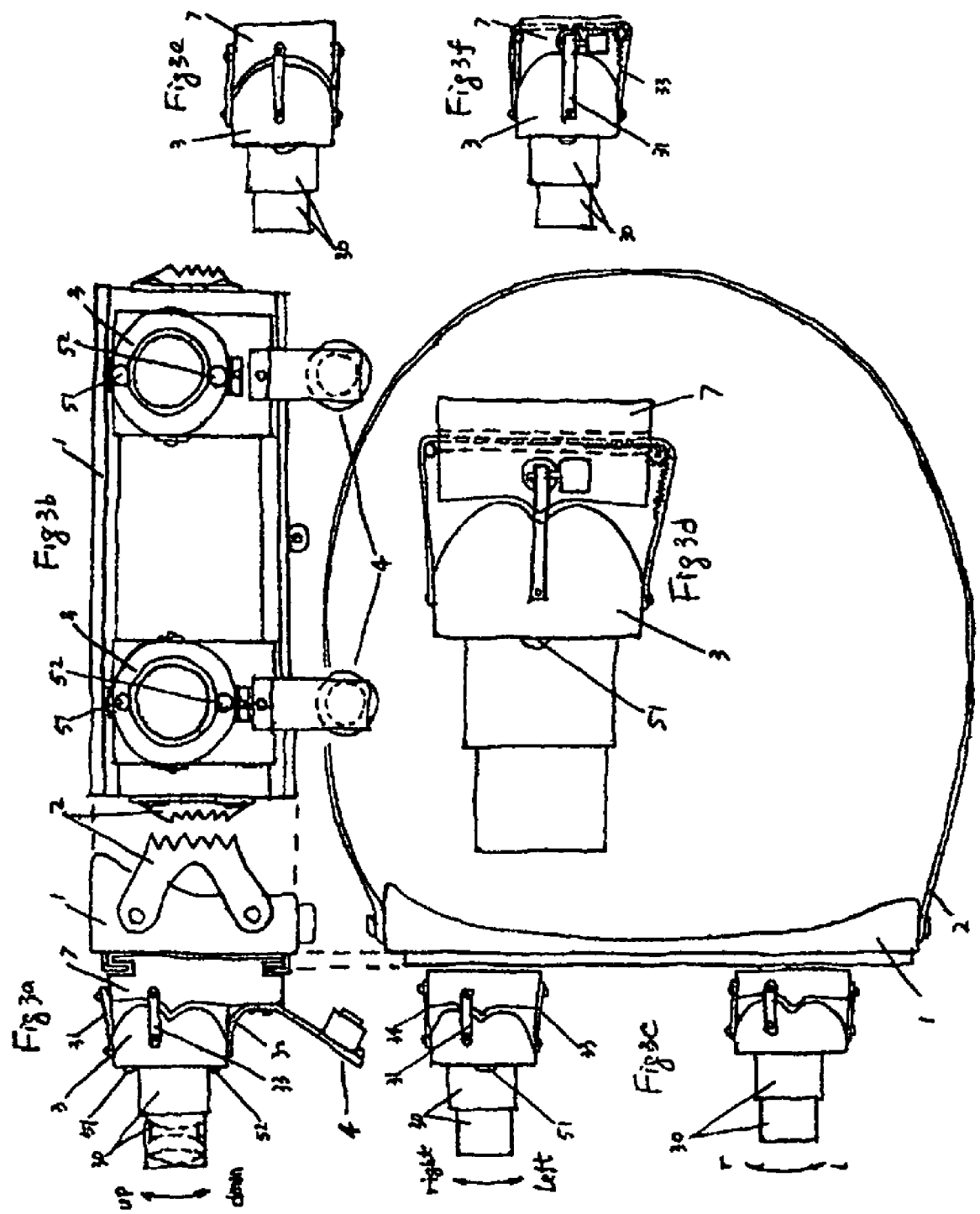

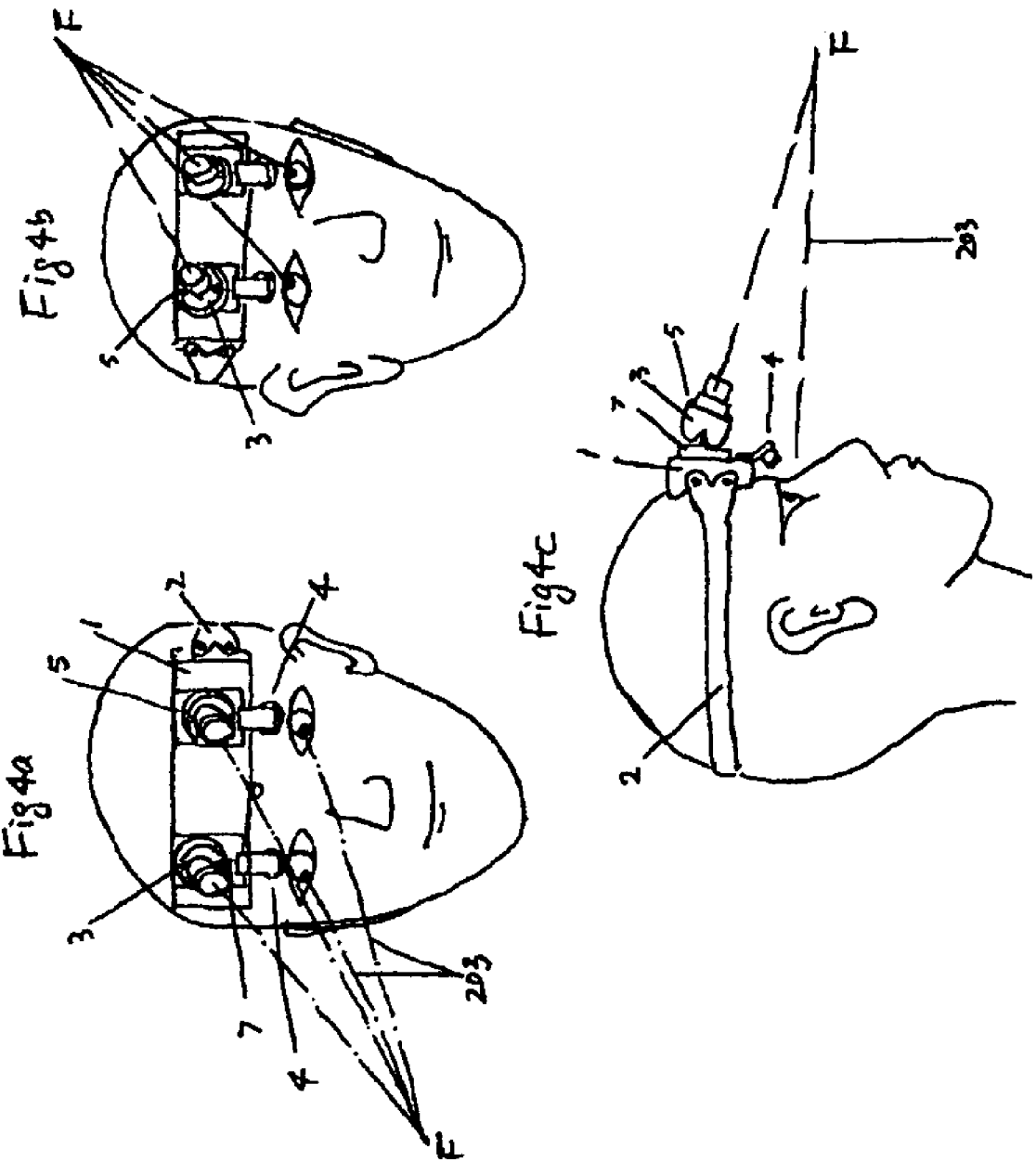

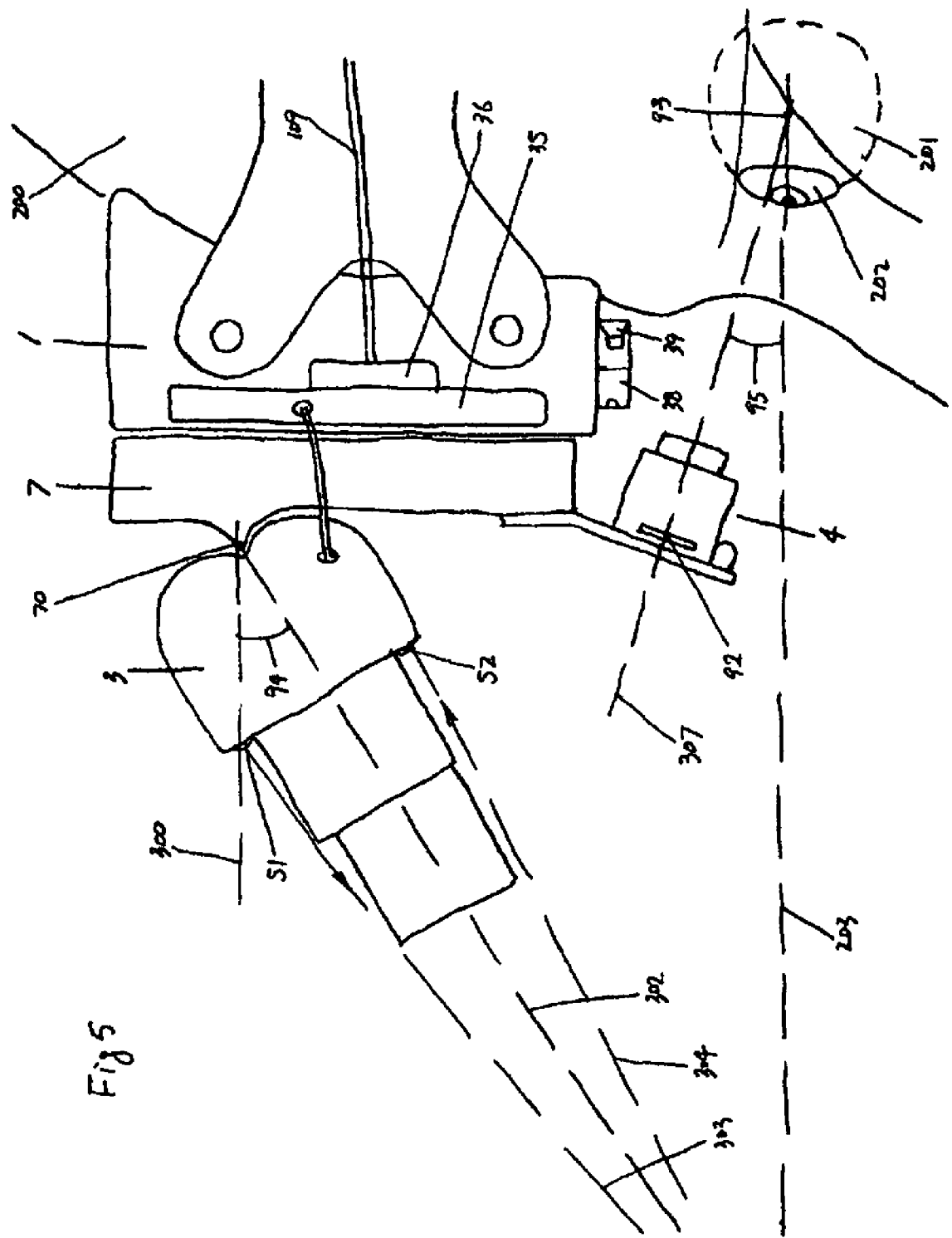

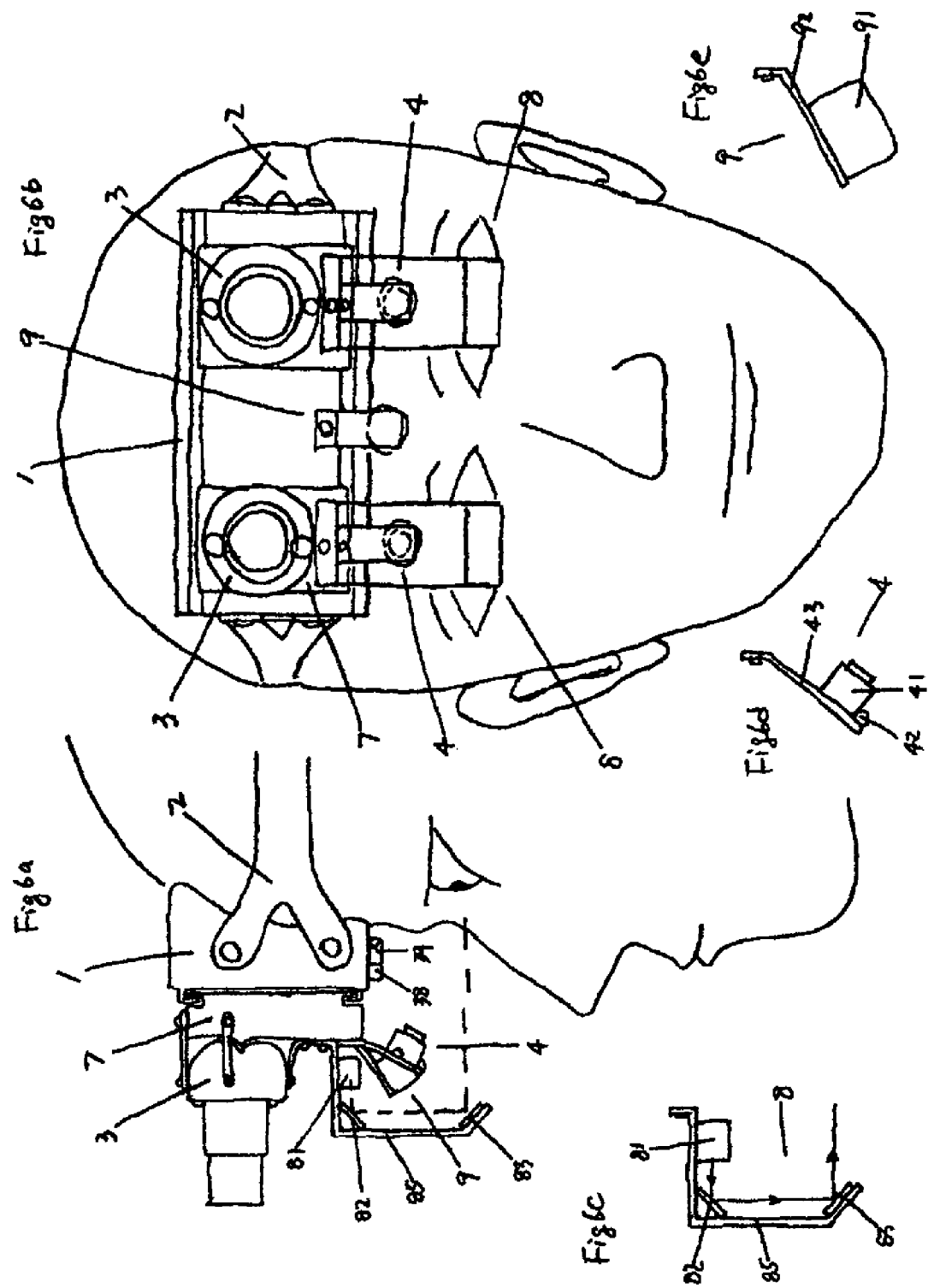

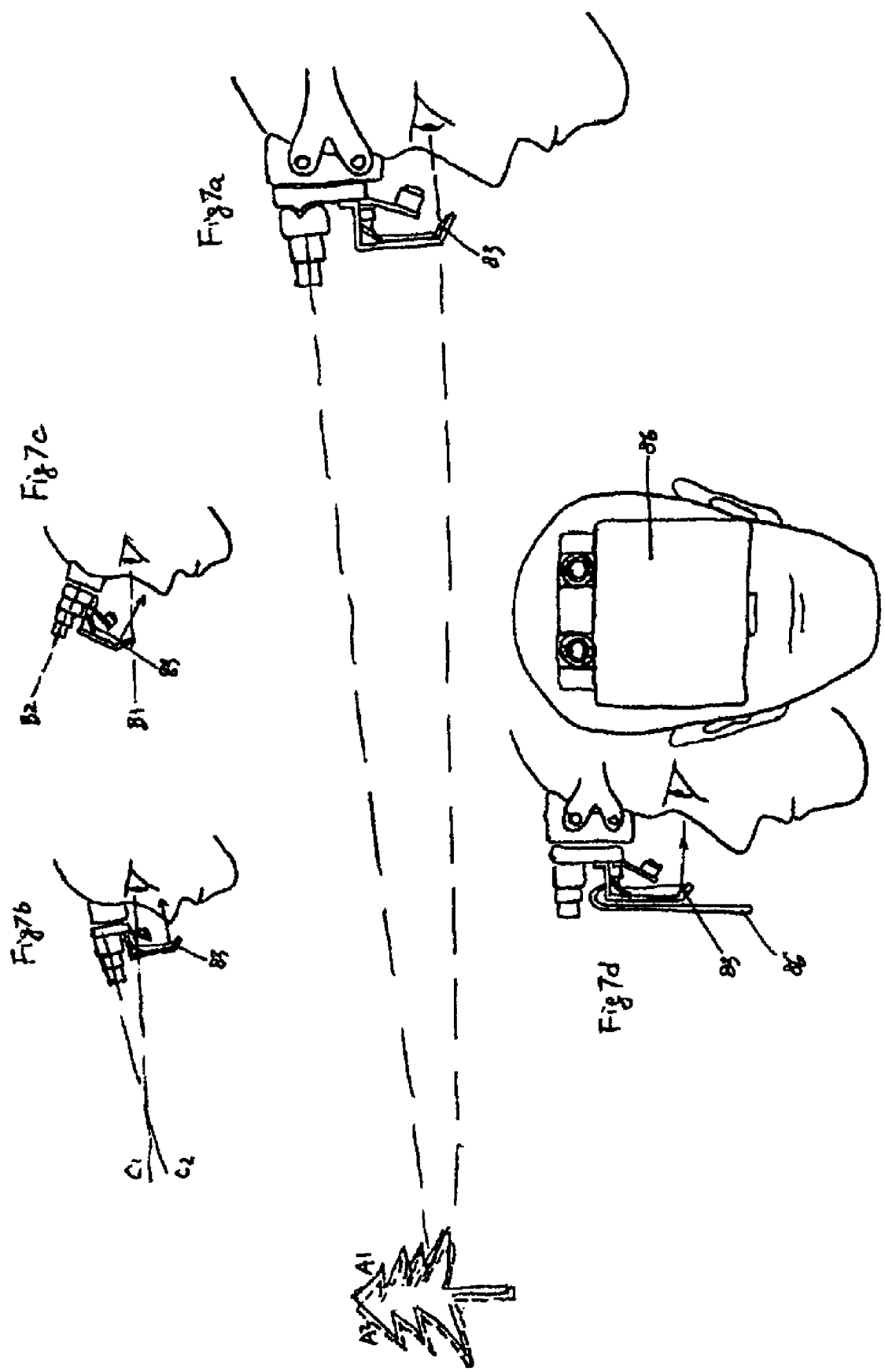

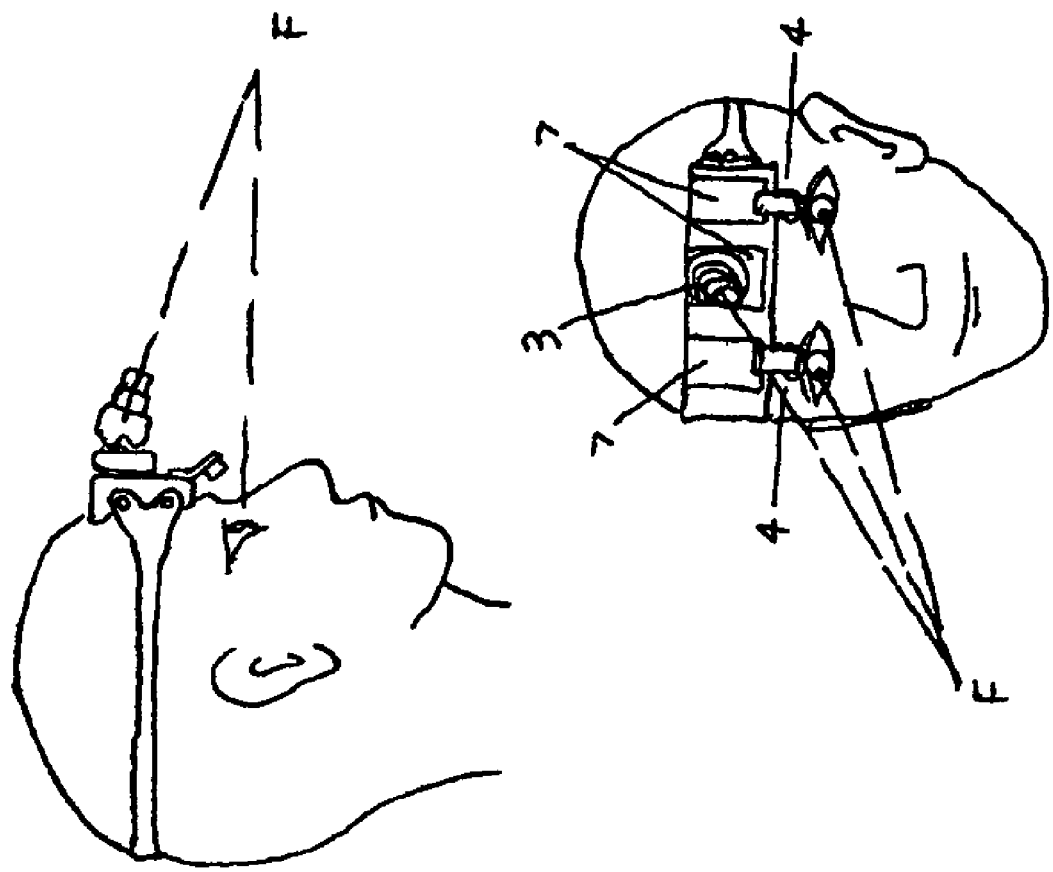
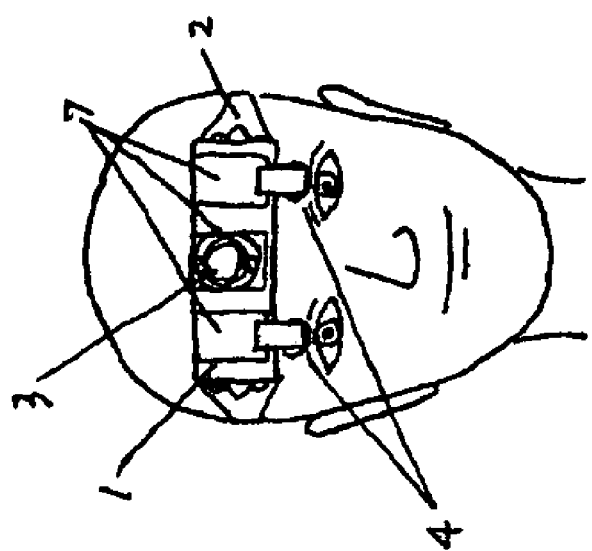
Fig 8

FULLY AUTOMATIC, HEAD MOUNTED, HAND AND EYE FREE CAMERA SYSTEM AND PHOTOGRAPHY

FIELD OF THE INVENTION

The head mounted commercial digital camera, camcorder and the photography.

BACKGROUND OF THE INVENTION

There are lots of patents involving the head mounted camera, but none of them was really used commercially. The films camera is too big and too heavy to mount on the human's head. Although ccd and cmos sensor are widely adopted, almost all of patents relate to head mounted camera are short of automatic aiming and focusing, thereby cannot capture the scenery the user's eyes are really seeing. The U.S. Pat. No. 6,307,526 proposed the idea of using eye tracker; but the size of lens, the visual field of the lens and the angle of the lens can be turn around are limited. Another weakness of this patent is that at least one eye of the user must gaze at the viewfinder constantly. This patent also not use portable personal computer, lacks powerful compute and control ability to realize automatic aiming and focusing automatically, continuously and in the real time, lacks huge memory to store the pictures and video.

The current price of color cmos digital camera header with 300,000 pixels and the range finder chip are few dollars. The error of eye gaze analysis system (LL Technologies, Inc) is 0.45 degree, i.e. about 1.4 inch at 15 feet distance. Gaze direction is determined using the pupil-center-corneal reflection method and the image processing and gaze point calculations are performed in c++ software on a personal computer with Windows 2000. The first commercial product using material of artificial muscle (electroactive polymer) was on the market in January 2003, when Japan's Eamex began selling battery-powered plastic fish that swim around aquariums and look practically indistinguishable from the real thing. All these products have a characteristic that is they are small and light. All these technologies lay down a foundation for my invention.

SUMMARY OF THE INVENTION

This invention integrates new technologies including ccd cmos digital camera header, eye hall tracker, range finder, lcd, and artificial muscle, with the most important technology— portable personal computer (including laptop, palm, pda, small single board computer, even cellular phone and ipads) together to create the full automatic, head mounted, hand and eye free camera system and the photography.

This system comprises a head mounted camera header, a portable personal computer and a hand hold controller. The head mounted camera header comprises two sets of eye ball tracker range finder/digital camera header.

by using two eye ball trackers to take the pictures of pupils and cornea of two eyes continuously, portable personal computer calculates the direction of the eye sight using these pictures and controls two digital camera headers to turn around such that the direction of optical axial of the digital camera header is always following the direction of eye sight. portable personal computer also controls two range finders to transmit and receive infrared ray, measures the distance between the eyes and the target, then controls the lens of digital camera headers to focalize on the target. When users press the shot button on hand hold controller, portable personal computer controls digital camera headers to take pictures and to save them in portable personal computer, or controls digital camera headers to start record video. because using the powerful portable personal computer, all of the processes are automatic, continuous, and in the real time.

User do not need hold the camera in hand, no longer worry about the aiming and focusing; at any condition and any moment, just push a button, the scenery in user's eyes will be captured. This is a true process of "What you see is what you get (photo or video)". The user will never miss any wonderful or any important scenery. because all of the processes are automatic, continuous, and in the real time, this is also a very easy and convenient way to take picture or record video, and suit for anybody from child to older, even disabled.

BRIEF DESCRIPTION OF THE DRAWINGS

FIG. 1 shows a man with the full automatic, head mounted, hand and eye free camera system: a head mounted camera header is attached on his forehead, a portable personal computer is hanged at his waist, and the hand hold controller is hold in his hand.

FIG. 2 shows head mounted camera header attached on a man's forehead.

FIG. 3 shows the side view, front view and top view of an embodiment of head mounted camera header.

FIG. 4 shows how the lens is aimed at and focused on a target.

FIG. 5 shows the positions of digital camera header, eye ball Tracker, range finder, the forehead and the eyes.

FIG. 6 shows the details of head mounted display, eye ball Tracker and face camera.

FIG. 7 shows how to use head mounted display to help to attach the head mounted camera header to forehead correctly and how to review the pictures or video stored in portable personal computer.

FIG. 8 shows another embodiment of the invention as claimed in claim 2.

DETAILED DESCRIPTION OF THE INVENTION

As showed in FIG. 1a, the full automatic, head mounted, hand and eye free camera system comprises a head mounted camera header 100, a portable personal computer 101, and a hand hold controller 102. The head mounted camera header is attached on the forehead right above the eyes. controlled by a portable personal computer, head mounted camera header always automatically aims at and focuses on the target the eyes are seeing; continuously takes pictures and transmits them to the portable personal computer without any assistance of hands and eyes. The only thing user have to do is to press the shoot button on hand hold controller to instruct portable personal computer to take a picture. The portable personal computer save this picture captured by head mounted camera header to a directory in which the sound is recorded five seconds before and after the moment the button being pressed, so there will be a picture with a corresponding sound. The user can also press a record button on hand hold controller to instruct portable personal computer to start record video with sound. The user does not need aiming at target by using a viewfinder, does not need worry about adjusting focus. further more, beyond the ability of human's eye, user can zoom the lens of the digital camera header any time by using hand hold controller, to capture the part of scene which user is specially interested in the whole scenery. portable personal computer can be hanged at the waist, on the should, in the backpack or the pocket. hand hold controller can also be put in the pocket. because this camera frees hands and eyes, it can take a picture or record a video at any time any condition, no matter the user is talking, walking, working, even when the user is thinking, his head does not moved, only the eyes are turning, this camera can record exactly what the eyes are pointing to. This camera is a natural and reasonable integration of modern technologies and the design is user convenient and comfortable.

FIG. 1b shows the details of portable personal computer 101 where are a lcd, a cpu and/or dsp, a dram and/or flash memory, a hard disk and/or dvd/cd-rw drive, a battery and a high speed serial port like usb, ieee1394, ethernet or Wireless port. portable personal computer can be a laptop pc, a palm pc, a pda, a cell phone, an ipads or a single board computer. The portable personal computer communicates with head mounted camera header using high speed serial port 105 and cable 109, communicates with hand hold controller 102 using a serial port 106.

FIG. 1c shows a hand hold controller. The hand hold controller communicates with portable personal computer using a serial port 107. The communication can be wired or wireless. The function of the buttons on hand hold controller can be defined by software.

FIG. 2 shows a head mounted camera header attached to a user's forehead. The head mounted camera header comprises two eye ball Trackers 4, two digital camera headers 3 and two range finders 5. Two eye ball trackers and two digital camera headers are fixed on two slip blocks 7, which are mounted on a light and rigid install base 1. The install base 1 is located at the forehead above the two eyes and is attached to head using a stretchy hand 2. The range finder 5 comprises an infrared led and a lens 51 to emit infrared ray, a lens 52 and a range finder chip to receive reflected ray; and locates on the digital camera headers. controlled by portable personal computer, eye ball trackers take the pictures of the pupils and the cornea of the two eyes automatically, continuously and in real time; portable personal computer calculates the direction of the eye sight using these pictures automatically, continuously and in real time and controls the digital camera headers to turn around such that the direction of optical axial line 302 of digital camera headers is always following the direction of eye sight 203 automatically, continuously and in real time; portable personal computer also controls two range finders, to emit and receive infrared ray at the direction of eye sight, measures the distance between the eyes and the target, then controls lens 30 of digital camera header to focus on the target automatically, continuously and in real time. This is the principle of the automatic aiming and automatic focusing without any assistance of user's hands and eyes, and without requiring any viewfinder.

FIG. 3a, FIG. 3b and FIG. 3c show the side view, front view and top view of an embodiment of the head mounted camera header respectively. These figures show the details of the digital camera header 3. The digital camera header 3 comprises an optical lens 30 with zoom machine, a cmos or a ccd sensor and corresponding control logic, which is inside of body of the digital camera header and not showed here. The strip 31,32,33 and 34 make up of the servo driver and are made from material of artificial muscle. by applying electric voltage to them, the strips will stretch or contract. Thus, controlled by portable personal computer, the digital camera header can swing up and down, left and right on slip block 7, and the lens 30 will been aimed at direction of eye sight. The optical lens 30 of the digital camera header can move forward and backward, focus on the target of eye, and zoom in or out, which are also controlled by portable personal computer by using the artificial muscle. Using artificial muscle material can remove noise and save power. The FIG. 3d shows another embodiment of the digital camera header's servo driver, it uses strap with teeth, step motor and gear. FIG. 3e and FIG. 3f show other embodiments of digital camera header, slip block 7 and servo driver. The bottom of the digital camera header 3 is not concave here. by adjusting the location of two slip blocks on Install base 1, digital camera headers 3 and eye ball trackers 4 are placed right above the two eyes. Two emit lens 51 and receive lens 52 of the range finder 5 are mounted on digital camera header 3. Thus, the infrared ray emitted from the emit lens is in the same direction of the optical axial line of the lens 30 of the digital camera header.

FIG. 4 shows how the lens are aimed at and focalized on the target. Controlled by portable personal computer, eye ball trackers 4 take the pictures of two eyes continuously. portable personal computer calculates the direction of eye sight 203 using these pictures, measures the distance between the eyes and the target f using the range finder, and drives digital camera header 3 to aim at and focalize on target f automatically, continuously and in real time without any assistance of hands and eyes, and does not need any viewfinder.

FIG. 5 shows the position of digital camera header 3, eye ball tracker 4, range finder 5 (51,52), the forehead 200 and eyes 201. When the Install base 1 is attached on the forehead firmly, the relationship among the point 70 (the rotation center of digital camera header), the point 93 (the center of the eye ball), and the point 92 (the center of cmos sensor of eye ball tracker) will not change. The solid angle 95 of eye sight 203 can be calculated exactly, so the solid angle 94 of the optical axial of lens of digital camera header can be educed correctly. A microphone 38 and a speaker 39 are also showed here, the surrounding sound can be recorded in portable personal computer, and the speaker can be used to replay the recorded sound or to play various reminders or instructions.

FIG. 6 shows the details of the head mounted display, the eye hall tracker and the face camera. The head mounted display 8 comprises a lcd 81, a mirror 82, a semitransparent mirror 83 and a transparent support frame 85. The lcd shows the scene captured by digital camera header 3, reflected by two mirrors 82 and 83, this scene is superposed on the scene at the front of eyes. by comparing the two scenes, the user can adjust the location of head mounted camera header on the forehead, until the difference of two scenes is very small. Then head mounted display can be taken from the slip block 7 of head mounted camera header.

The eye hall tracker 4 comprises a support frame 43, an infrared led 42 and a cmos camera 41; the infrared ray from the led 42 irradiates eyes, the camera 41 take the infrared picture of the pupils and corneas of the eyes always and transmits these pictures to portable personal computer, portable personal computer calculates the direction of eye sight automatically, continuously and in real time.

The face camera 9, which is located at center of two eye ball trackers and fixed at the Install base 1, comprises a support frame 92 and a cmos camera 91. face camera always takes picture of the user's face. If the picture changed, it means the head mounted camera header moved, portable personal computer will tell user using speaker 39 to adjust the location of head mounted camera header with the help of head mounted display if the movement is too big. The head mounted display can be mounted onto and unmounted from the slip blocks 7 easily. In normal usage, head mounted display will be taken off from the slip blocks 7.

In FIG. 5, there is a microprocessor 35 with high speed serial port 36 in the Install base. The microprocessor communicates with digital camera headers, eye ball trackers, range finders, head mounted displays, face camera, microphone, speaker and servo drivers via cables. The microprocessor also communicates with portable personal computer using high speed serial port 36 via cable 109.

FIG. 7 shows how to use head mounted display to attach head mounted camera header correctly and review the picture recorded in portable personal computer, scene A1 at the front of eyes is captured by digital camera header, and is displayed at head mounted display. It appears at mirror 83 of head mounted display as scene A2. If these two sceneries superpose perfectly, as shown in FIG. 7a, the head mounted camera header is in the correct place. otherwise, as shown in FIG. 7b or FIG. 7c, adjustments are needed. To review the records in portable personal computer, a black shield board 86 is hanging behind the mirror 83 as shown in FIG. 7d. because these pictures are take from two digital camera headers and are reviewed using two head mounted displays, the user will see a three dimensional scene. User can review the record by using the lcd monitor on the portable personal computer too, but that will appear as a two dimensional picture.

FIG. 8 shows another embodiment of the invention. There is only one digital camera header 3 on the head mounted camera header. Three dimensional picture and video need twice memory space; using one digital camera header can save lots, but will loss three-dimensional visualization.

Although only a few exemplary embodiments of this invention have been described in details above, it should be understood that the present invention is not limited to those precise embodiments and various changes and modifications there of could be made by one skilled in the art without materially departing from the teachings, spirit or scope of the invention as defined in the appended claims.

The invention claimed is:

1. A full automatic, head mounted, hand and eye free camera system comprises: a head mounted camera header, a portable personal computer, and a hand hold controller; the head mounted camera header comprises two digital camera headers, two range finders, two eye ball trackers, two head mounted displays, a face camera, a microphone, a speaker, two adjustable slip blocks, a light and rigid install base and a stretchy band to attach the install base on the forehead of a user; the two digital camera headers and the two eye ball trackers are fixed on the respective two slip blocks; the two digital camera headers can swing up and down left and right on the two slip blocks driven by four servo drivers; the two slip blocks are mounted on the install base; the two range finders are fixed at the respective two digital camera headers; the head mounted camera header comprises a microprocessor with a high speed serial port, the microprocessor communicates with the digital camera headers, the eye ball trackers, the range finders, the head mounted displays, the face camera, the microphone, the speaker and the servo drivers using cables; the microprocessor communicates with the portable personal computer using the high speed serial port via cable or wireless channel; the digital camera headers each comprises an optical lens, which is adjustable with zoom adjustment machine, a CMOS or a CCD sensor and corresponding control logic; the eye ball trackers each comprises an infrared LED, an optical lens, a CMOS or a CCD sensor, and corresponding control logic; the range finders each comprises an infrared LED with a lens, a range finder chip with a lens and corresponding control logic; the portable personal computer comprises a LCD, a CPU and/or a DSP, a DRAM and/or a flash memory, a hard disk and/or DVD/CD-RW drive, a battery, a high speed serial port, and a serial port; the portable personal computer communicates with the microprocessor in the head mounted camera header using the high speed serial port via cable or wireless channel; the portable personal computer communicates with the hand hold controller using serial port; the hand hold controller comprises pushbuttons and a serial port to communicate with the portable personal computer, the communication can by wired or wireless.

2. A full automatic, head mounted, hand and eye free camera system comprises a head mounted camera header, a portable personal computer, and a hand hold controller; the head mounted camera header comprises one digital camera header, one range finder, two eye ball trackers, two head mounted displays, a face camera, a microphone, a speaker, three adjustable slip blocks, a light and rigid install base and a stretchy band to attach the install base on the forehead of a user; the one digital camera header and the two eye ball trackers are fixed on the respective three slip blocks; the one digital camera header can swing up and down left and right on the one slip block driven by four servo drivers; the three slip blocks are mounted on the install base; the one range finder is fixed at the digital camera header; the head mounted camera header comprises a microprocessor with a high speed serial port, the microprocessor communicates with the digital camera header, the eye ball trackers, the range finder, the head mounted displays, the face camera, the microphone, the speaker and the servo drivers via cables; the microprocessor communicates with the portable personal computer using the high speed serial port via cable or wireless channel; the digital camera header comprises an optical lens, which is adjustable with zoom adjustment machine, a CMOS or a CCD sensor and corresponding control logic; the eye ball trackers each comprises an infrared LED, an optical lens, a CMOS or a CCD sensor, and corresponding control logic; the range finder comprises an infrared LED with a lens, a range finder chip with a lens and corresponding control logic; the portable personal computer comprises a LCD, a CPU and/or a DSP, a DRAM and/or a flash memory, a hard disk and/or DVD/CD-RW drive, a battery, a high speed serial port, and a serial port; the portable personal computer communicates with the microprocessor in the head mounted camera header using the high speed serial port via cable or wireless channel; the portable personal computer communicates with the hand hold controller using serial port; the hand hold controller comprises pushbuttons and a serial port to communicate with the portable personal computer, the communication can by wired or wireless.

3. A full automatic, head mounted, hand and eye free photography method comprises: using two eye ball trackers to take pictures of the pupils and cornea of two eyes automatically, continuously and in real time; using a portable personal computer to calculate the direction of the eye sight using the pictures of the pupils and cornea of two eyes and to control two digital camera headers to turn around such that the direction of optical axial of the digital camera headers is always following the direction of eye sight; using the portable personal computer to control two range finders to transmit and receive infrared ray, to measure the distance between the eyes and the target, then to control the digital camera headers to adjust its optical lens to focalize on the target; using pushbuttons on a hand hold controller to instruct the portable personal computer to control the digital camera headers to aim at and focus on the target, to zoom in or out, to start or stop taking picture and to save these pictures in portable personal computer; using one digital camera header for 2-dimensional photography; using two digital camera headers for 3-dimensional photography; using a microphone to record surrounding sound; using two head mounted display to review the pictures or video captured and recorded by the digital camera headers; using a face camera to monitor location of the head mount camera header at the user's head; using a speaker to replay the recorded surrounding sound and to play various reminders or instructions; using the portable personal computer to communicate with the digital camera headers, the eye ball trackers, the range finders, the head mounted displays, the microphone and the speaker via high speed serial port; using the portable personal computer to communicate with the hand hold controller via a serial port.

* * * * *